(12) United States Patent
Stransky

(10) Patent No.: US 9,769,138 B2
(45) Date of Patent: *Sep. 19, 2017

(54) METHOD FOR UPDATING A TABLE OF CORRESPONDENCE BETWEEN A LOGICAL ADDRESS AND AN IDENTIFICATION NUMBER

(71) Applicant: Nagravision S.A., Cheseaux-sur-Lausanne (CH)

(72) Inventor: Philippe Stransky, Chesaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,618

(22) Filed: Jun. 15, 2015

(65) Prior Publication Data

US 2015/0312238 A1 Oct. 29, 2015

Related U.S. Application Data

(63) Continuation of application No. 14/330,721, filed on Jul. 14, 2014, now Pat. No. 9,077,706, which is a (Continued)

(30) Foreign Application Priority Data

Sep. 30, 2004 (EP) .................................. 04104784

(51) Int. Cl.
*G06F 15/173* (2006.01)
*H04N 7/173* (2011.01)
(Continued)

(52) U.S. Cl.
CPC .............. *H04L 63/08* (2013.01); *H04L 29/06* (2013.01); *H04L 61/103* (2013.01); *H04L 61/2076* (2013.01)

(58) Field of Classification Search
CPC ........... H04N 21/4367; H04N 21/6334; H04N 21/6336; H04N 21/64
See application file for complete search history.

(56) References Cited

U.S. PATENT DOCUMENTS 5,278,829 A 1/1994 Dunlap
6,374,354 B1 * 4/2002 Walmsley et al. ............ 713/167
(Continued)

FOREIGN PATENT DOCUMENTS

| CN | 1341338 A | 3/2002 |
| WO | WO-0051386 A1 | 8/2000 |
| WO | WO-2004025926 A1 | 3/2004 |

OTHER PUBLICATIONS

International Search Report (PCT/ISA/210).

*Primary Examiner* — Kyu Chae
(74) *Attorney, Agent, or Firm* — Harness, Dickey & Pierce, P.L.C.

(57) ABSTRACT

A method and system for updating a table of correspondence between a logical address associated to a user unit in a communication network and a unique identification number associated to one of a group of user units managed by a management center, a method where messages are exchanged between said management center and a specific user unit of said group by using said communication network, these messages being forwarded to the logical address of the specific user in said network, the method including searching in said table for the logical address of the user unit in said communication network corresponding to the unique identification number of the specific user unit; sending of messages to the user unit having the concerned unique identification number, to the logical address corresponding to said communication network; and if the messages are received incorrectly, sending a request containing an identifier of said specific user unit.

11 Claims, 2 Drawing Sheets

Related U.S. Application Data continuation of application No. 11/664,063, filed as application No. PCT/EP2005/054896 on Sep. 28, 2005, now Pat. No. 8,812,624.

(51) Int. Cl.
*H04L 29/06* (2006.01)
*H04L 29/12* (2006.01)

(56) References Cited

U.S. PATENT DOCUMENTS

| | | | |
|---|---|---|---|
| 6,393,484 B1 | 5/2002 | Massarani | |
| 6,982,953 B1* | 1/2006 | Swales | 370/218 |
| 7,228,558 B1* | 6/2007 | Lebouill | 725/86 |
| 7,234,163 B1* | 6/2007 | Rayes et al. | 726/22 |
| 8,812,624 B2* | 8/2014 | Stransky | 709/220 |
| 9,077,706 B2* | 7/2015 | Stransky | H04L 29/06 |
| 2002/0023174 A1 | 2/2002 | Garrett et al. | |
| 2003/0005435 A1* | 1/2003 | Nelger et al. | 725/31 |
| 2004/0049586 A1* | 3/2004 | Ocepek | H04L 29/12009 709/229 |
| 2004/0088552 A1* | 5/2004 | Candelore | 713/185 |
| 2005/0177860 A1* | 8/2005 | Goyal | H04N 5/44 725/118 |
| 2006/0005036 A1* | 1/2006 | Hu et al. | 713/182 |
| 2009/0052661 A1 | 2/2009 | Fahrny et al. | |

\* cited by examiner

METHOD FOR UPDATING A TABLE OF CORRESPONDENCE BETWEEN A LOGICAL ADDRESS AND AN IDENTIFICATION NUMBER

PRIORITY INFORMATION

This is a continuation of U.S. application Ser. No. 14/330,721 filed Jul. 14, 2014, which is a continuation of U.S. application Ser. No. 11/664,063 filed Mar. 29, 2007, which is a national phase under 35 U.S.C. §371 of PCT International Application No. PCT/EP2005/054896 which has an International filing date of Sep. 28, 2005, which claims priority to European Patent Application No. EP 04104784.6 filed Sep. 30, 2004, the entire contents of each of which are incorporated herein by reference.

FIELD OF THE INVENTION

This invention relates to a method for updating a table of correspondence between a logical address associated to a user unit in a communication network and a unique identification number associated to this user unit of a group of user units.

The user unit allows in particular access to conditional access content or data, this data being transmitted by a network such as, for example, the Internet.

In the context of this invention, two types of sending are simultaneously used. Indeed, content such as for example Pay-TV events, is sent in broadcast mode to several user units, generally to a large number of units. This content is generally encrypted in such a way that a user not in possession of the required decrypting keys is not able to access the encrypted content. These keys are sent according to a second sending type, in messages individually addressed to each user unit, via a network of communication means in which each user has a logical address.

PRIOR ART

Conventionally, a user unit includes data processing means, which can be a computer, a decoder or another similar element and a security module responsible for the cryptographic operations associated to the access or processing of the data. As it is well known, this security module can be essentially achieved according to four distinct forms. One of these is a microprocessor card, a chip card, or more generally an electronic module (taking the form of key, a badge, . . . ). This type of module is generally removable and connectable to the decoder. The form with electric contacts is the most widely used, but a connection without contact for example of the type ISO 14443 is not excluded.

A known second form is that of an integrated circuit shell, generally placed definitively and irremovably in the decoder. An alternative is made up of a circuit mounted on a display base or connector such as a SIM module connector.

In a third form, the security module is integrated into an integrated circuit shell also having another function, for example in a descrambling module of the decoder or the microprocessor of the decoder.

In a fourth embodiment, the security module is not produced in material form, but its function is implemented only in software form. Given that in the four cases, the function is identical although the security level differs, we can talk about a security module regardless of the way in which its function is carried out or the form that this module may take.

The user unit includes a unique identification number that can be stored in the processing means of the data and/or in the security module. Conventionally, several user units form a group that is managed by a management centre. In the scope of the present invention, the user units and the management centre can communicate between each other by means of a communication network that can be in particular a global network such as the Internet. According to the configuration of the network, a management centre can have difficulties in initiating a communication with a user unit. Preferably, it is the user unit that initiates the communication by sending a request to the management centre. This request can pass through several routing devices before reaching the management centre. At the moment in which the user unit starts the communication with the management centre, a communication channel between the management centre and the user unit is maintained open, so that communications can also be transmitted from the management centre towards the user unit.

A dynamic address is assigned to the user unit to allow communication with the management centre. This dynamic address is generally different for each communication session.

When a message must be sent back to the multimedia unit that has initiated the communication and transmitted the request, the management centre sends its message using the channel or dynamic address that is maintained open during the session.

The U.S. Pat. No. 5,278,829 describes a process that allows a management centre to send messages to a user unit. More precisely, this patent describes a control process of physical addresses of a receiver host, generally a computer, inside a network. This network is made up of a host transmitter and several host receivers. Each host is identified by a physical address. These physical addresses are stored in the host transmitter and are associated to a temporary value such as the date of their last use.

When the transmitter must send a message to a receiver, it searches for the physical address of this receiver in its memory. If it finds said address, it determines if the stored date is older than a threshold value. If this is not the case, the transmitter sends the message to the receiver. If the date is older than the threshold value, the transmitter sends a first message to the receiver, using the stored physical address. It then waits for a receipt from the receiver. If it receives this receipt, the transmitter sends the content to the receiver. On the contrary, if it does not receive a receipt, it diffuses a message to all the receivers requesting the receipt for this message. If it receives a receipt, it can then store the new physical address of the receiver that has sent back the receipt.

The method described in this patent only works in the very particular cases in which a host receiver almost never changes its physical address. In fact, as a message is transmitted to a physical address stored in the host transmitter, if the physical addresses are modified for each activation, the possibilities of a message arriving at the correct user unit are practically null.

Moreover, as the physical addresses are generally reassigned, it is possible for the management centre to send a message to a user unit other than the desired unit even when this user unit sends back a receipt to the management centre to confirm the correct reception of the message.

In the conventional systems in which the physical addresses change and are re-assigned at each connection, the process described in U.S. Pat. No. 5,278,829 fails to work.

This process presents the drawback that the messages sent are very often unnecessary and occupy bandwidth which could be used in a much more suitable way. Moreover, the reception of the message by an undesired user unit can have consequences in terms of security.

Another process consists of starting a reinitialization step when the user unit no longer works. The aim of this process is to transmit the unique identification number to the management centre, by means of a communication network, using a specific address.

In this case, the subscriber must wait until the reinitialization is completed. This can last a relatively long time, normally several minutes, during which time the decrypting of the data is not possible.

Another problem with the methods of the prior art is known under the term "Address spoofing" or address usurpation. Using this process, a user unit can modify an identifier connected to the communication address in such a way that the management centre believes it is communicating with a specific user unit when in reality it is transmitting data to another unit.

AIMS OF THE INVENTION

This invention intends to withdraw the drawbacks of the processes of the prior art by carrying out a process that allows an automatic update of a table of correspondence between the logical addresses of the communication network and the unique identification number of the user units. This update is carried optimally since the search for the addresses is only undertaken for addresses that have changed. The bandwidth is thus not unnecessarily occupied. It also aims to transmit quickly a content or data to a user unit, without any time loss for the user. Moreover, the update is carried out without the user momentarily losing access to the service.

This invention also aims to ensure that the management centre actually communicates with the user unit registered to the stored address. This has two functions. On one hand, it is used to prevent a message from being sent to a false address. On the other hand, it is used to prevent a user unit from fraudulently passing itself off as another user unit (address spoofing).

These aims are achieved by a method for updating a table of correspondence between a logical address (AD) associated to a user unit in a communication network and a unique identification number (UA) associated to a user unit of a group of user units managed by a management centre (CG), a method in which messages are exchanged between said management centre and at least one specific user unit (STB*) of said group by means of said communication network, these messages being forwarded to the specific user unit (STB*) using the logical address (AD*) of said user unit in said network, characterized in that it comprises the following steps:

search in said table of correspondence (TC) for the logical address (AD*) of the user unit in said communication network corresponding to the unique identification number (UA*) of the specific user unit (STB*);

sending of messages to the user unit (STB*) having the concerned unique identification number (UA*), to the logical address (AD*) corresponding to said communication network;

in the case of incorrect reception of the messages, sending of a request containing an identifier of said specific user unit (STB*), this request being sent to all or a part of the user units (STB) forming said group;

detection of a return message of a user unit (STB*) whose unique identification number (UA*) corresponds to said identifier contained in the request;

determination of the logical address (AD*) in said network, used by the user unit (STB*) having transmitted the return message;

verification of the logical address (AD) by establishing a communication between the management centre and the user unit (STB*) and authentication of the specific user unit by the management centre, storage in the table of correspondence (TC) of the management centre of said logical address (AD*) of the user unit in said network, in connection with said unique identification number (UA*) of the user unit (STB*) having transmitted the return messages.

According to the method of the invention, the management centre automatically detects a change in the communication address associated to a specific user unit. This automatic detection is possible thanks to the use of a return message or a receipt. More particularly, the receipt can be made in different ways. According to a first way, a request is sent to a user unit by the management centre, using the logical address known by the management centre. If a message is returned to the management centre by the user unit, the logical address will be considered as correct. This very simple method operates only if the logical addresses that are no longer in service are not re-assigned to another user unit, as is generally the case in practice.

According to another method, when the management centre sends back to a user unit a response to a request originating from this unit, the response contains the unique identification number of the user unit for which the response is intended. The user unit then verifies its own unique identification number and sends back a return message or receipt to the management centre indicating whether or not its identification number corresponds to that contained in the response.

According to a third method, the management centre asks the user unit to send its unique identification number. This is compared at the level of the management centre and not at the level of the user unit as in the previous case.

According to a fourth method, a true authentication of the user unit is carried out. For this, one of the possible authentication procedures consists in sending a message containing a number to the user unit that is to be authenticated, for example a random number generated by the management centre. This message is then received by the user unit and then encrypted with a key contained in this unit, in the decoder or in the security module. Any other form of mathematical modification using one unique variable per user unit can be used. This random encrypted number is sent back to the management centre. The management centre decrypts the message received by means of a key stored in the management centre and corresponding to the user unit that is the object of the search. The decrypted value is compared to the initial random number. If these are equal, the user unit is considered as authentic. If not, the user unit is considered as fraudulent and the messages addressed to this unit are not sent to it. These messages can in particular be rights or keys allowing access to the encrypted contents.

The keys used for authentication can of course be symmetrical or asymmetrical keys.

It should be noted that this detection step can be carried out without interrupting the access to data by the user, namely the user can continue to use the service and for example visualize data during the detection.

When the logical address of a user unit has changed, the latter sends a request to the management centre, indicating the new logical address as well as the identification data connected to the user unit. This new address can be stored in the management centre after authentication.

During all these operations, the user is not prevented from using the service. This update is thus carried out in a totally transparent way for the user.

BRIEF DESCRIPTION OF THE DRAWINGS

This invention and its advantages will be better understood with reference to a preferred embodiment of the invention and to the enclosed drawings in which.

WAYS TO CARRY OUT THE INVENTION

Figure 1:
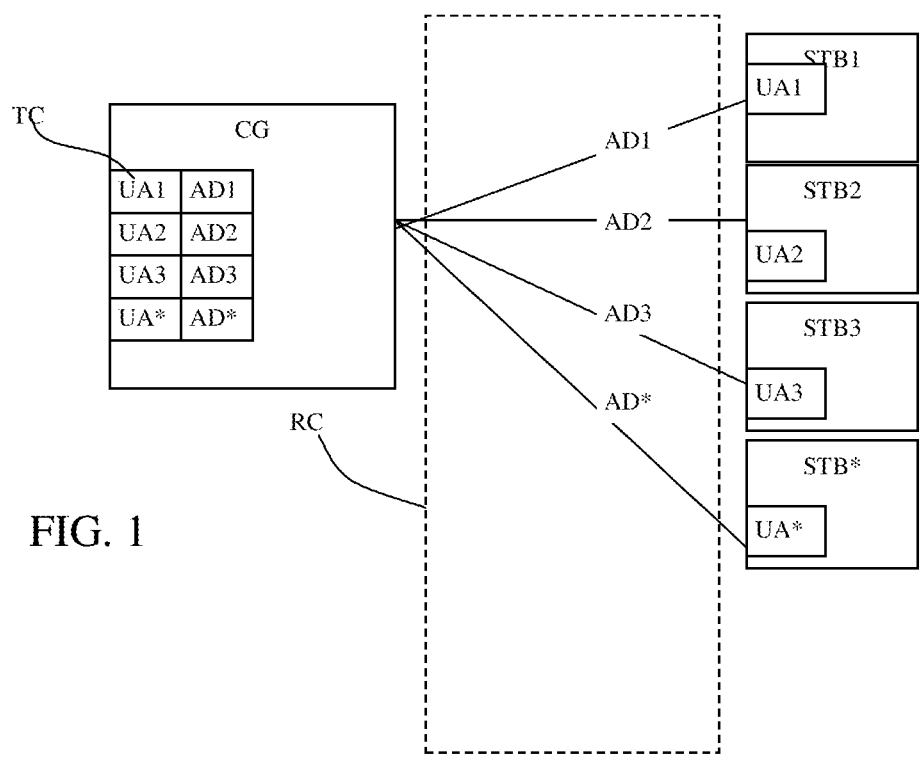
FIG. 1 represents the assembly system to which the process of the invention is applied.

With reference to the Figures, the process of the invention is carried out in an environment in which content or data such as, in particular, conditional access data is transmitted to user units STB. This data can in particular be content in the field of Pay-TV or data associated to services. The user units can be a decoder or a computer for example, containing a security module. The data is transmitted by a data supplier and is diffused by a diffusion centre to the majority or of all the user units. On the contrary, the access rights are distributed in point-to-point form only to authorized users. These access rights are processed by a management centre CG. The diffusion centre and the management centre can be two distinct entities or alternatively the same entity. The data is transmitted to user units by means of a line in a communication network RC such as for example the Internet network. A physical communication address corresponds to this line. More particularly, the physical communication address can be made up of a chain of physical addresses and communication ports that correspond to physical addresses of devices used between the management centre and a specific user unit.

The user units STB managed by one management centre CG are part of a group of user units. Each unit has a unique identification number UA that is generally stored in a security module associated to a decoder, the decoder and the security module forming this user unit. It should be noted that this identification number UA is in a format belonging to the management centre. This means that it has no meaning at the level of the communication network between the management centre and the decoders.

Each user unit is associated to a logical address AD of the communication network. This logical address is that which is used by the management centre to transmit a message to a specific user unit. This logical address is made up of a static IP address, a MAC address or of an alphanumeric character sequence which can constitute a name, for example. A logical address could be, for example, "decodeur.nagra.com". The logical address is generally stored in the decoder.

The connection between the physical variable address and the fixed logical address is established in a known way by means of a server known under the acronym DHCP server (Dynamic Host Configuration Protocol). On the other hand, the DNS server maintains a correspondence list between the address defined by the DHCP server and the logical address of the user unit.

The management centre contains a table of correspondence TC between the logical address AD of a decoder in the communication network and the unique identification number UA of the corresponding security module. This table of correspondence can also contain a key that is associated to each user unit.

As a rule, the physical communication address between a user unit and the management centre changes frequently, for instance during each activation of the user unit. Alternatively, it is possible for the security module to be associated to another decoder. In this way, a message arriving at a user unit is not correctly addressed since the security module (the address UA) is no longer the same and the message will not be received by the desired security module.

Figure 2:
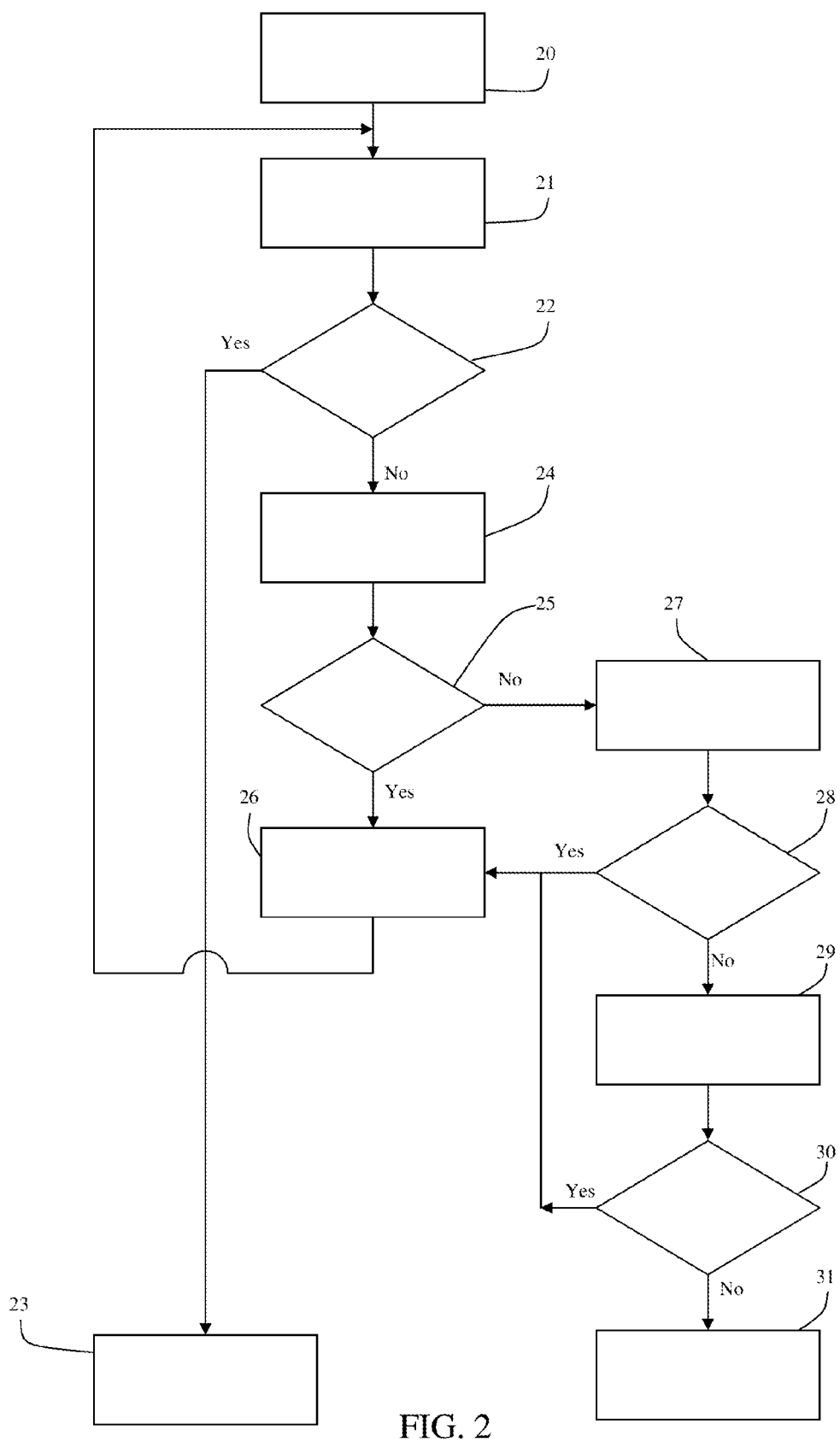
FIG. 2 represents the steps of the process of the invention.

In the method of the invention, when a message must be sent to a specific user unit STB*, the management centre CG searches in the table of correspondence TC, to find the logical communication address AD* of the communication network corresponding to the unique identification number UA* of the specific user unit STB*. This is disclosed by step 20 in FIG. 2. When the logical address is not a real address (IP, MAC), the management centre will collaborate with the intermediate routing devices between the management centre and the concerned user unit in order to determine in a conventional way the physical address to be used to send the message to the logical address corresponding to this user unit, during step 21. This step can, for example, be carried out by means of a server of the DNS type (Domain name system) that defines a hierarchy in the used names. On one hand, this hierarchy allows the uniqueness of the logical addresses to be assured and on the other hand allows the physical address corresponding to this logical address to be found. In the following step 22, the management centre verifies if it has obtained a return message or receipt from the concerned user unit, in which the correct reception of the message is indicated. If it receives this receipt, the data of the table is maintained as it is with respect to the specific user unit. This is represented by the step 23 in FIG. 2. On the contrary, in the case of the non-reception of a receipt, the table must be updated. The non-reception of a receipt can be signalled by a "delivery failure message" indicating that the initial message has not been delivered or on the contrary by the absence of the reception of a receipt after a certain time period.

For the update of the table TC when the message has not been delivered, the management centre transmits a request to a group of user units or to all the user units managed by this management centre. In the embodiment illustrated, the request is sent, during the step with the reference 24, to a first assembly of user units. This request contains at least one identifier of the specific user unit that is the object of the search as well as a command requesting the user unit to send back a message to the management centre. The identifier can be in particular the unique identification number UA*.

During step 25, the management centre verifies that it has received a return message from the specific user unit STB*. If this is the case, it determines the logical address AD* in the communication network which has been used to send the return message.

Before storing the new logical address, an authentication process is generated in order to ensure that the new address really corresponds to that of the user unit that is the object of the search and not to another user unit having usurped an address. As previously indicated, a possible authentication process consists in sending to the user unit that is to be authenticated, a random number generated by the management centre. This number is then encrypted with a key contained in the user unit. This encrypted random number is sent back to the management centre where it is decrypted by means of a key stored in the management centre and corresponding to the user unit that is the object of the search. The decrypted value is compared to the random initial number. If these are the same, the user unit is considered as authentic.

In general, every authentication process of a user unit can be used. Among the possible procedures, it is possible to determine a signature of a unit by means of a one-way function such a hashing or other suitable mathematical operations.

The authenticated logical address is stored in the table of correspondence of the management centre, opposite the unique identification number UA* of the specific user unit. This corresponds to step 26 in FIG. 2. Messages can then be sent to the specific user unit STB* using the specific logical address AD*, according to step 21 previously mentioned. The address tables contained in the concerned DNS servers are also updated.

During the previous step 25, if the management centre determines that it has not received a return message, it sends a request to another group of user units. This corresponds to a step with the reference 27. The management centre then verifies, during step 28, if it has received a return message and updates the table of correspondence, during the following step 26 if a message has been received. If no message has been received, the management centre sends a message to all the user units under its management. This corresponds to step 29. It then verifies, during step 30 if it has received a return message and updates the table of correspondence if this is the case.

On the contrary, if no message is received in return, several solutions are possible, symbolized by the reference 31. One of these consists in restarting the updating process after having waited a certain time. Another consists of not sending any more messages to the user unit concerned and storing an indication in the table, according to which this user unit is unavailable. In this case, the subscriber in possession of this user unit can request the reactivation, for example by telephoning the management centre.

The method of the invention has been described according to a particular embodiment in which the request is first sent to a subset of user units, then, if the specific unit has not been found in this subset, it is sent to another subset of user units and finally to all the user units. It is clear that the number of subsets can be larger or smaller. It is also possible to send the request to all the user units from the first sending.

The subset can be formed on the basis of a communication "sub-network", each sub-network being associated to particular communication equipment such as a router, for example. The assembly of these sub-networks forms the communication network between the management centre and the group of user units.

It is also possible to optimize the search by selecting as parts of the first subset to which the request is sent, a certain number of user units among which the possibilities of finding the specific user unit that is the object of the search are greater. This can be determined, for example, from the last address stored by this user unit and using the hierarchy defined in a DNS server.

The invention claimed is:

1. A system comprising:
    a plurality of user units for accessing content, each of the user units including a detachable security module, the plurality of user units each being associated with a logical address in a communications network, the security modules of each of the user units having unique identification (ID) numbers, respectively, and being configured to perform one or more cryptographic operations related to access of the content; and
    a management center, the management center storing a correspondence table indicating, for each of one or more user units from among the plurality of user units, the logical address associated with the user unit,
    wherein the management center is configured to,
        determine a first physical address based on the correspondence table, the first physical address being a first logical address or a physical address corresponding to the first logical address, the first logical address being the logical address indicated by the correspondence table as being associated with a first unit from among the plurality of user units,
        send one or more messages to the first physical address, and
        based on receiving no response to the one or more messages from the first unit,
            send a first request to each user unit of a first group of user units, from among the plurality of user units, the first group of user units including at least two user units, the first request including a first unique ID number, the first unique ID number being the unique ID number of the security module of the first unit,
    wherein the plurality of user units are configured such that, for each user unit of the plurality of user units,
        when the user unit is included in the first group of user units to which the management center sends the first request and when the first unique ID number included in the first request is the unique ID number of the security module of the user unit, the user unit responds to the first request by sending a return message including the unique ID number of the security module of the user unit, and
    wherein the management center is further configured to, receive the return message, and
        when the return message includes the first unique ID number,
            establish communication between the management center and a responding unit using a second logical address,
                the responding unit being a user unit, of the plurality of user units, from which the return message was received,
                the second logical address being the logical address of a decoder of the responding unit,
            authenticate the responding unit, and
            when the authentication is correct, store the second logical address and the first unique ID number in the correspondence table in a corresponding manner.

2. The system of claim 1, wherein the plurality of user units include a plurality of decoders, respectively, and the security modules of the plurality of user units are included in the decoders of the plurality of user units,
    the decoder of the responding unit being one of the plurality of decoders.

3. The system of claim 2, wherein, for each user unit from among the plurality of user units, the logical address associated with the user unit is a logical address of the decoder included in the user unit, and
    wherein the plurality of user units are configured to receive and process messages received from the management center via the communications network.

4. The system of claim 3, wherein the correspondence table includes, for each of one or more user units from among the plurality of user units, a pair of data entries including,
  the unique ID number of the security module of the user unit and the corresponding logical address of the decoder of the user unit.

5. The system of claim 4,
  wherein the management center is configured to authenticate the responding unit by,
    sending a first authentication message containing a first value generated by the management center to the responding unit;
    receiving a response authentication message from the responding unit, the response authentication message including a second value; and
    comparing said second value with a reference value, and
  wherein the responding unit is configured to,
    receive the first authentication message including the first value,
    extract the first value,
    transform the first value using a key included in the responding unit, and
    send to the management center, as the response authentication message, a message including the second value, the second value being the transformed first value.

6. The system of claim 5, wherein the management center is configured to generate the first value as a random number.

7. The system of claim 4, wherein the management center is configured to select the first group of user units according to a probability criteria in such a way that a probability that the first unit belongs to the first group is greater than a probability that the first unit belongs to another group including a same number of user units as the first group.

8. The system of claim 4 wherein,
  each user unit in the plurality of user units is configured to receive encrypted data transmitted in broadcast mode, and
  the management center is configured to transmit access messages to the plurality of user units in point-to-point mode, the access messages containing information that allows the plurality of user units to access the encrypted data.

9. The system of claim 4, wherein the logical addresses of the decoders of the plurality of user units are alphanumeric codes.

10. The system of claim 4, wherein the logical addresses of the decoders of the plurality of user units are stored in the decoders of the plurality of user units.

11. The system of claim 4, wherein the management center is further configured such that, when the unique ID number included in the return message does not correspond to the first unique ID number, the management center sends a second request to a second group of user units from among the plurality of user units, the second group of user units being different from the first group of user units.

\* \* \* \* \*